(12) United States Patent
Gradu et al.

(10) Patent No.: US 6,544,140 B2
(45) Date of Patent: Apr. 8, 2003

(54) PINION MOUNTING WITH DIRECT TAPERED ROLLER BEARING ARRANGEMENT

(75) Inventors: Mircea Gradu, Wooster, OH (US); Harold E. Hill, Uhrichsville, OH (US)

(73) Assignee: The Timken Company, Canton, OH (US)

( * ) Notice: Subject to any disclaimer, the term of this patent is extended or adjusted under 35 U.S.C. 154(b) by 39 days.

(21) Appl. No.: 09/836,956

(22) Filed: Apr. 17, 2001

(65) Prior Publication Data

US 2002/0183156 A1 Dec. 5, 2002

(51) Int. Cl.$^7$ .............................................. F16H 48/06
(52) U.S. Cl. ....................................... 475/246; 384/585
(58) Field of Search ................................ 475/246, 247, 475/253, 331; 384/584, 585

(56) References Cited

U.S. PATENT DOCUMENTS

| | | | |
|---|---|---|---|
| 1,506,037 A | 8/1924 | Alden et al. | |
| 1,536,824 A | * 5/1925 | Domizi ...................... | 475/246 |
| 2,018,188 A | 10/1935 | Padgett et al. | |
| 2,019,464 A | 10/1935 | Riblet | |
| 2,037,074 A | 4/1936 | Griswold | |
| 2,118,760 A | 5/1938 | Ernst | |
| 2,142,575 A | 1/1939 | Spicacci | |
| 2,350,459 A | 6/1944 | Hillcoat et al. | |
| 3,006,700 A | 10/1961 | Hoffman | |
| 3,310,999 A | 3/1967 | Griffith | |
| 4,103,567 A | 8/1978 | Franco et al. | |
| 4,273,391 A | 6/1981 | Asberg | |
| 4,597,312 A | 7/1986 | Hicks et al. | |
| 4,824,264 A | 4/1989 | Hoebel | |
| 5,094,655 A | 3/1992 | Sato | |
| 5,098,355 A | 3/1992 | Long | |
| 5,203,750 A | 4/1993 | Oster et al. | |
| 5,363,722 A | * 11/1994 | Klotz ........................... | 403/79 |
| 5,492,419 A | * 2/1996 | Miller et al. ................ | 384/477 |
| 5,913,745 A | 6/1999 | Inagaki et al. | |
| 6,024,666 A | * 2/2000 | Bunnow ...................... | 475/230 |
| 6,056,663 A | 5/2000 | Fett | |
| 6,200,241 B1 | 3/2001 | Pinotti et al. | |
| 6,293,704 B1 | * 9/2001 | Gradu ......................... | 384/557 |
| 6,364,803 B1 | * 4/2002 | Barnholt et al. ............ | 475/230 |

FOREIGN PATENT DOCUMENTS

| | | |
|---|---|---|
| JP | 62278370 | 5/1988 |
| JP | 08238948 | 1/1997 |
| JP | 10009259 | 4/1998 |

* cited by examiner

Primary Examiner—Richard M. Lorence
Assistant Examiner—Dennis Abdelnour
(74) Attorney, Agent, or Firm—Polster, Lieder, Woodruff & Lucchesi, L.C.

(57) ABSTRACT

A pinion mounting with direct tapered roller bearing arrangement for differential gear mechanisms includes a first tapered roller bearing and a second tapered roller bearing to provide support for a pinion shaft, the pinion mounting and pinion shaft being removable from the differential gear mechanism without disassembly of other components of the differential gear mechanism. The first tapered roller bearing incorporates a continuous seal and o-ring, with the first tapered roller bearing either mounted to the differential gear mechanism case by retaining a mounting flange on the bearing cup, or threaded into the differential gear mechanism case by threads on the exterior of the bearing cup. A plurality of shims are used to set the bearing preload and to dimensionally set a pinion shaft gear with a ring gear of the differential gear mechanism.

35 Claims, 3 Drawing Sheets

PINION MOUNTING WITH DIRECT TAPERED ROLLER BEARING ARRANGEMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Technical Field

This invention relates in general to a tapered roller bearing design and arrangement and, more particularly, to a direct tapered roller bearing arrangement for mounting a pinion gear into a differential gear mechanism wherein the design and installation method of the tapered roller bearings provide a number of significant advantages over indirect tapered bearing mounting arrangements.

2. Description of Related Art

Differential gear mechanisms transfer rotational torque from an input shaft member to a pair of output shaft members. The input member is usually driven by a torque generating device such as a gasoline engine or an electric motor. Normally, the torque from the torque generating device is transferred to the input shaft member of a differential gear mechanism by a yoke which is splined to engage with one end of the input shaft member.

In conventional differential gear assemblies the output shaft members are generally located perpendicular to the input shaft member. Most differential gear mechanisms use a drive pinion gear which mates with an adjoining ring gear to transfer the torque from the input shaft member to the output shaft members. Anti-friction bearings are incorporated into the differential gear assembly to allow all shaft members to rotate in a generally free manner.

The design and bearing arrangement of previous differential gear mechanism designs offer a wide variety of pinion gear bearing arrangements. U.S. Pat. No. 6,056,663 to Fett is one example of the current state of the commonly accepted arrangement of pinion bearings. There, the pinion gear uses two tapered roller bearings to support the shaft of the pinion gear. However, the mounting style for the bearings makes it very difficult to replace these bearings. The differential gear mechanism must be substantially disassembled to replace the bearings. Additionally, the pinion gear on the pinion shaft is unsupported by any bearing which leaves the pinion gear unsupported in the mechanism allowing heavy cantilever loads to be placed upon the pinion shaft bearings.

U.S. Pat. No. 5,098,355 to Long describes a differential gear mechanism which uses tapered roller bearings on the pinion shaft mounted in a manner which allows for a somewhat easier replacement of the pinion shaft bearings. However, the bearings are arranged in an indirect mounting style which fails to provide the stiffest support for the pinion shaft. While the pinion gear end of the pinion shaft is supported by a bearing, the bearing is not a tapered roller bearing and thus fails to offer adequate protection against the axial and thrust loads found in differential gear mechanisms. It is also clear that the bearing used to support the pinion gear end of the pinion shaft is not designed for easy replacement and will require substantial disassembly of the differential gear mechanism to replace the bearing.

In each of these examples, several bearings are used to support the pinion shaft gear. The large number of bearings used and the difficulty of replacing these bearings, makes these differential gear mechanisms costly to manufacture and to maintain. The type of bearings used and the arrangement of those bearings also fails to provide the best support for the pinion shaft to compensate for all of the radial and thrust loads which occur in differential gear mechanisms.

SUMMARY OF THE INVENTION

The present invention resides in a pinion mounting with a direct tapered roller bearing arrangement for use in differential gear mechanisms. Specifically, two tapered roller bearings are mounted in a direct arrangement, with tapered roller bearings uniquely designed for quick replacement and setting capabilities. One tapered roller bearing supports a pinion gear shaft at an intermediate point on the shaft. The bearing is designed for either flange mounting or threaded mounting of the tapered roller bearing to the exterior of the casing for a differential gear mechanism. The second tapered roller bearing supports the pinion gear end of the pinion gear shaft. Shims are used to dimensionally set the bearings to allow for proper bearing preload, and for proper engagement of the pinion gear and the ring gear of the differential gear mechanism.

The design of the present invention thus provides for a pinion mounting removable from the differential gear mechanism casing without disassembly of other components of the differential gear mechanism. The present invention also provides a simplified pinion assembly when compared to devices using indirect tapered roller bearing mounting. Bearing setting is also simpler in the present invention than in the standard tapered roller bearing arrangement, which also makes the present invention suitable for dimensional setting. Additionally, the current invention offers a more compact arrangement than an indirect tapered roller bearing or straddle mounting arrangement because of the shorter pinion stem and housing of the present invention. The seal is integrated into the exterior bearing of the present invention, thus creating a better sealing of the differential gear mechanism. Because load distribution is an important factor in differential gear mechanisms, it is important to note that the present invention also provides a better load distribution when compared to conventional straddle mounted bearings. This also translates to a potential for better stiffness within the present invention when compared to indirect mounted tapered roller bearings. Finally, as a result of the potential for bearing downsizing within the current inventions as compared to the conventional tapered roller bearing arrangement, the present invention also offers the significant potential for better efficiency in design when compared to straddle mounted bearings.

DETAILED DESCRIPTION OF THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
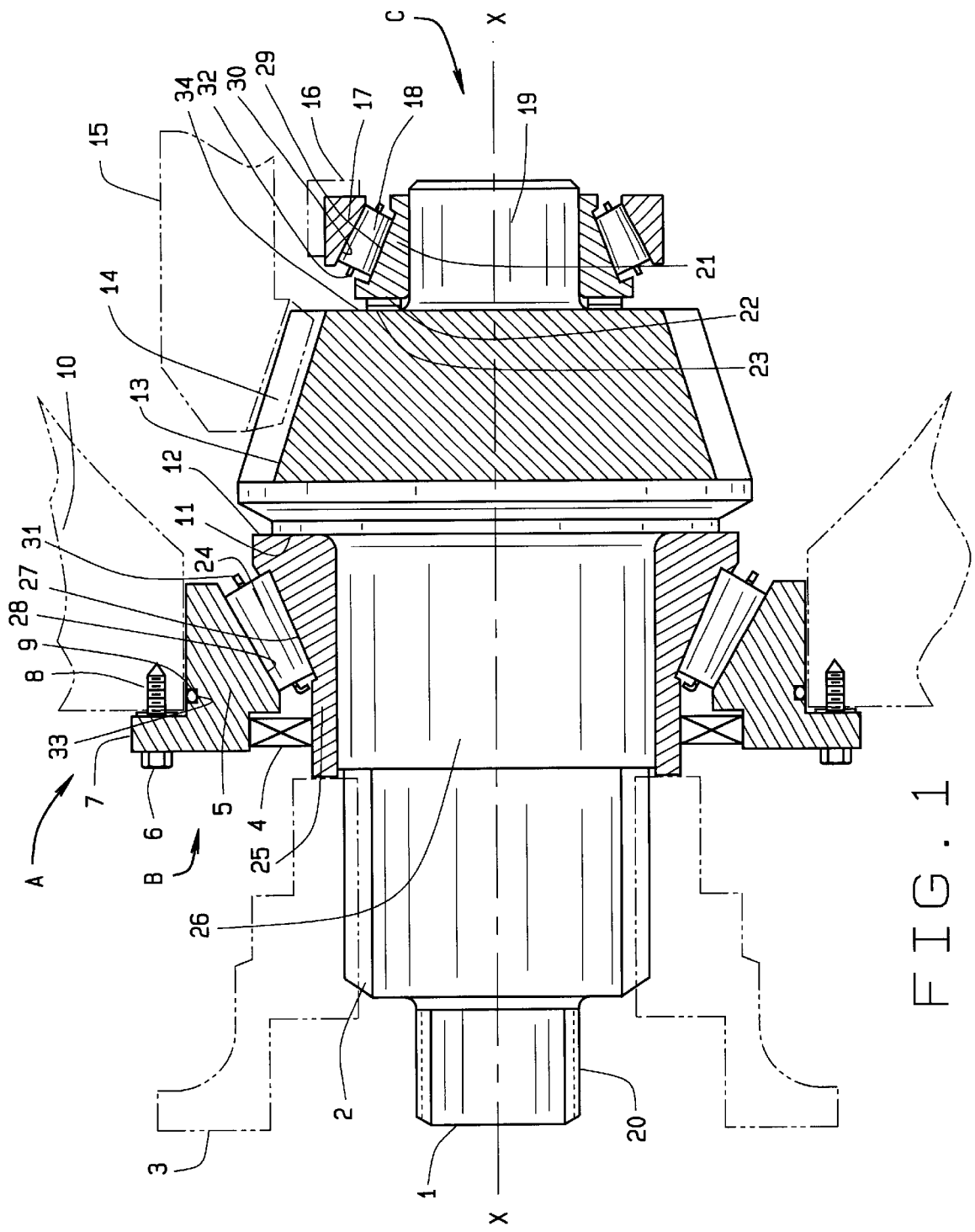
FIG. 1 is a longitudinal sectional view of a pinion mounting constructed in accordance with a first embodiment of the present invention.

Referring now to FIG. 1, a first embodiment of a pinion mounting A is shown. The pinion mounting A shows pinion shaft 1 supported by a direct tapered roller bearing arrangement. The direct tapered roller bearing arrangement includes an exterior flange mounted tapered roller bearing B as a head bearing, and an interior tapered roller bearing C as a tail bearing. A yoke 3 engages the pinion shaft 1 by a set of splines 2. The yoke is usually held in place on the pinion shaft 1 by a washer and a nut (not shown).

The pinion shaft 1 has a distal and a proximal end. The distal end has a threaded portion 20 for attaching the yoke mounting nut. Adjacent to the threaded portion 20 are the splines 2 for engaging a yoke 3. A cylindrical surface 26 is adjacent to the splines 2. The cylindrical surface 26 ends in a shoulder having a face 11. The proximal end of the pinion shaft 1 has an end cylindrical surface 19 which abuts a gear 13. The gear 13 may be a bevel gear, a hypoid gear, or any other gear capable of transferring the torque from the pinion shaft to the output shafts of the differential gear mechanism. Regardless of the type of gear, however, the gear 13 is configured to engage with the teeth 14 of a ring gear 15.

The flange mounted tapered roller bearing B includes an inner race 25 in the form of a cone, an outer race 5 in the form of a cup which surrounds the inner race 25, and rolling elements 24 in the form of tapered rollers which are located between the two races 25 and 5 to rotate relative to the outer race 5 or vice versa with little reaction torque. In addition, the flanged tapered roller bearing B has a cage 31 which is likewise located between the races 5 and 25, and the cage maintains the proper spacing between the rolling elements 24.

The inner race 25, which is configured to fit around the intermediate cylindrical surface 26 of the pinion shaft 1, has a raceway 27 which is presented outwardly away from the axis X, its centerline coinciding with the axis X. The outer race 5 has a raceway 28 which is presented inwardly toward the axis X and toward the raceway 27 of the inner race 25. The rollers 24 fit between the races 5 and 25 and roll along the raceways 27 and 28 when relative rotation occurs between the races 5 and 25.

The outer race 5 is attached to the casing 10 of the differential gear mechanism by a plurality of mounting bolts 6. The mounting bolts 6 are installed through a plurality of mounting holes in a radial flange 7 of the outer race 5. A set of bearing setting shims 8 are positioned between the radial flange 7 and the casing 10 of the differential gear mechanism. The bearing setting shims 8 are configured and selected as needed to locate and preload the flanged tapered bearing B and the interior tapered bearing C. An o-ring 9 is installed in a groove 33 of the outer race 5. A continuous seal 4 is interposed between the outer race 5 and the inner race 25. The o-ring 9 and the continuous seal 4 act to prevent lubricant leakage from the differential gear mechanism casing 10.

The interior tapered roller bearing C includes an inner race 21 in the form of a cone, an outer race 17 in the form of a cup which surrounds the inner race 21, and rolling elements 18 in the form of tapered rollers which are located between the two races 21 and 17 to rotate relative to the outer race 17 or vice versa with little reaction torque. In addition, the flanged tapered roller bearing C also has a cage 32 which is likewise located between the races 21 and 17, and the cage maintains the proper spacing between the rolling elements 18 and retains them around the inner race when the inner race is withdrawn from the outer race.

The interior bearing is sized to allow the removal of the interior bearing without interference with the ring gear of the differential gear mechanism. In particular, the inside diameter of the outer race 17 is sized to allow removal of the pinion shaft 1, in combination with the inner race 21 and rollers 18, without removing the ring gear of the differential gear mechanism.

The inner race 21, which is configured to fit around the end cylindrical surface 19 of the pinion shaft 1, has a raceway 29 which is presented outwardly away from the axis X, its centerline coinciding with the axis X. The outer race 17 has a raceway 30 which is presented inwardly toward the axis X and toward the raceway 29 of the inner race 21. The rollers 18 fit between the races 17 and 21 and roll along the raceways 29 and 30 when relative rotation occurs between the races 17 and 21.

A set of pinion setting shims 23 are interposed between face 22 of the inner race 21 and the face 34 of the pinion shaft 1. The pinion setting shims 23 are configured as needed to dimensionally locate the pinion gear 13 onto the teeth 14 of the ring gear 15.

In practice, the present invention provides a complete pinion mounting which can be removed without the disassembly of other components of the differential gear mechanism. Other pinion mounting conventionally require the removal or disassembly of the ring gear or other components of the differential gear mechanism before all of the pinion mounting can be removed. In contrast, the current invention allows for the removal of the pinion mounting upon removal of the outer race of the exterior bearing, either by removing the retainers holding the radial flange of the outer race of the exterior bearing, or by unscrewing the threaded outer race of the exterior bearing from the differential gear mechanism casing. Once the outer race of the exterior bearing is removed, the inner race and rolling elements of the exterior bearing, the pinion shaft, and the inner race and rolling elements of the interior bearing can be easily removed. The remaining outer race is then accessible for removable with bearing puller or other similar tool.

The design of the present invention also allows for a pinion mounting arrangement which can be adjusted to set the axial position of the pinion so it will mesh properly with the ring gear of the differential gear mechanism. The pinion shaft 1, the flanged tapered roller bearing B, and the interior tapered roller bearing C are held in place by the plurality of mounting bolts 6. By tightening the mounting bolts 6, pressure is applied to the outer race 5 which in turn biases the rolling elements 24 against the inner race 25. A face 12 of the inner race 25 is thus forced against a shoulder 11 machined into the pinion shaft 1, forcing the pinion shaft toward the interior tapered bearing C. The face 34 is pressed against the pinion setting shim washers 23 which in turn are forced against a back face 22 of the inner race 21. The force placed against the inner race 21 is transferred to the rolling elements 18 which further transfer this force to the outer race 17. A bearing mount 16 of the differential gear mechanism fixed in a position with respect to the casing 10 acts to brace the outer race 17 against the forces being applied to the outer race 17.

From this continuous transfer of force from the mounting bolts 6, through all of the pinion mounting components, and finally against the bearing mount 16, each of the tapered roller bearings B and C, and the pinion shaft 1, are held in place within the differential gear mechanism by the mounting bolts 6. Because all components of the invention are held in position by the mounting bolts 6, it can be seen that the installation and the removal of all of the pinion mounting components is greatly enhanced. The removal and replacement of all of the components can be accomplished by simply removing and installing the mounting bolts 6.

The direct bearing arrangement of the current invention is a simplified pinion bearing assembly providing a more compact arrangement than an indirect mounting arrangement. Additionally, the direct bearing arrangement gives better load distribution between the pinion bearings, as well as the potential for more overall stiffness to the pinion bearing assembly, while simultaneously increasing the ease by which the pinion bearings may be replaced.

Figure 2:
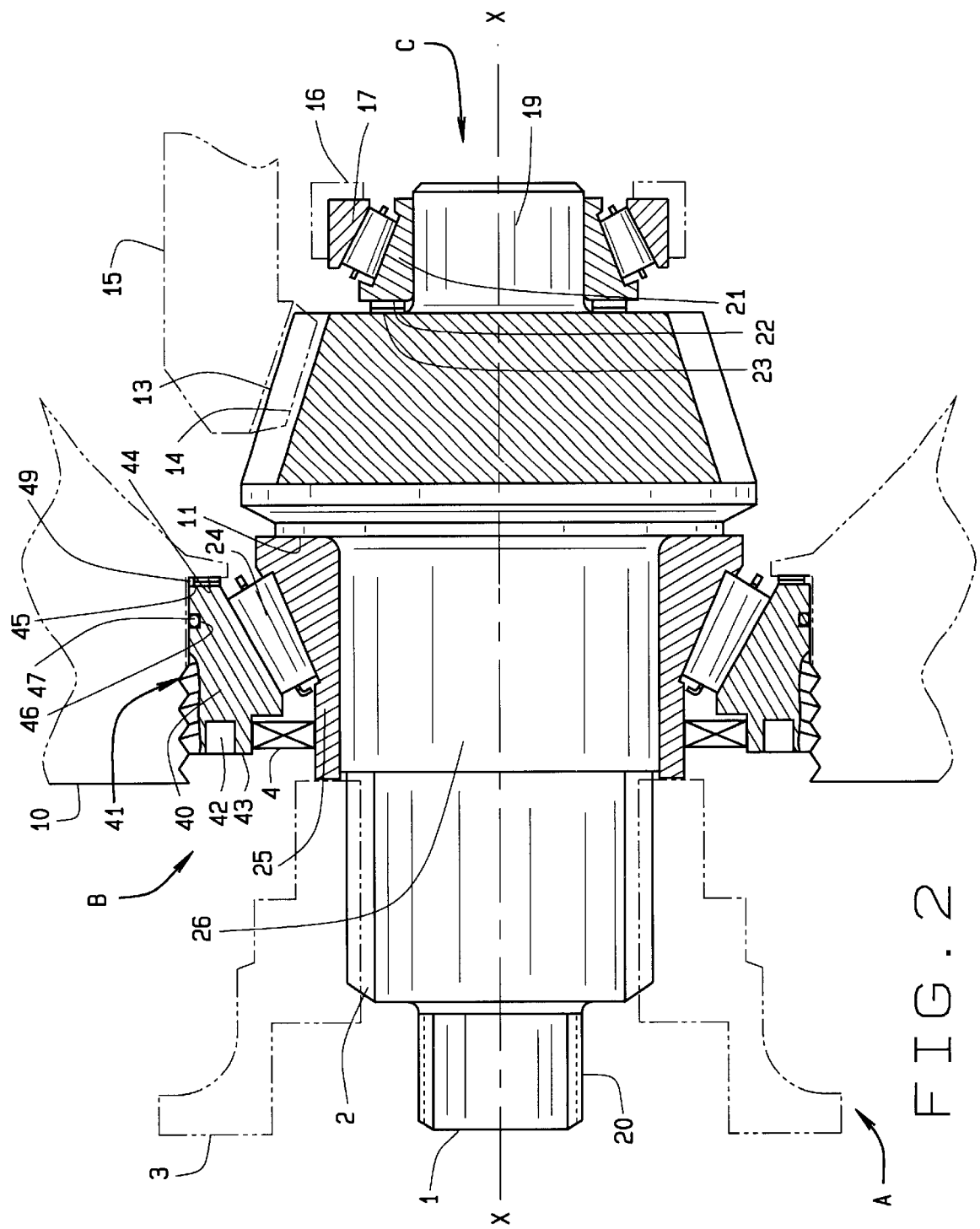
FIG. 2 is a longitudinal sectional view of a pinion mounting constructed in accordance with a second embodiment of the present invention.

Referring now to FIG. 2, a second embodiment of the present invention is disclosed. The second embodiment is similar to the first embodiment, with the exception that a different method of attaching the outer race to the casing of the differential gear mechanism is used. Rather than attaching a flanged bearing to the casing 10 of the differential gear mechanism with mounting bolts, the outer race 40 of the second embodiment includes threads 41 which mate with similar threads in the casing 10. A set of spanner slots 42 are arranged radially on the face 43 of the outer race 40, allowing the securing of the outer race 40 to the casing 10 with a spanner tool. While the second embodiment also uses an o-ring 47 and groove 46 to prevent entrance of contaminants, the location of the groove is changed slightly to allow for the threads 41 of the outer race 40. Additionally, the bearing setting shims 45 are placed between face 49 of the outer race 40 and face 44 of the bearing case 10 to locate and preload the pinion bearings. The general design and arrangement of the interior tapered bearing C in the second embodiment is similar to the interior tapered bearing C of the first embodiment.

Figure 3:
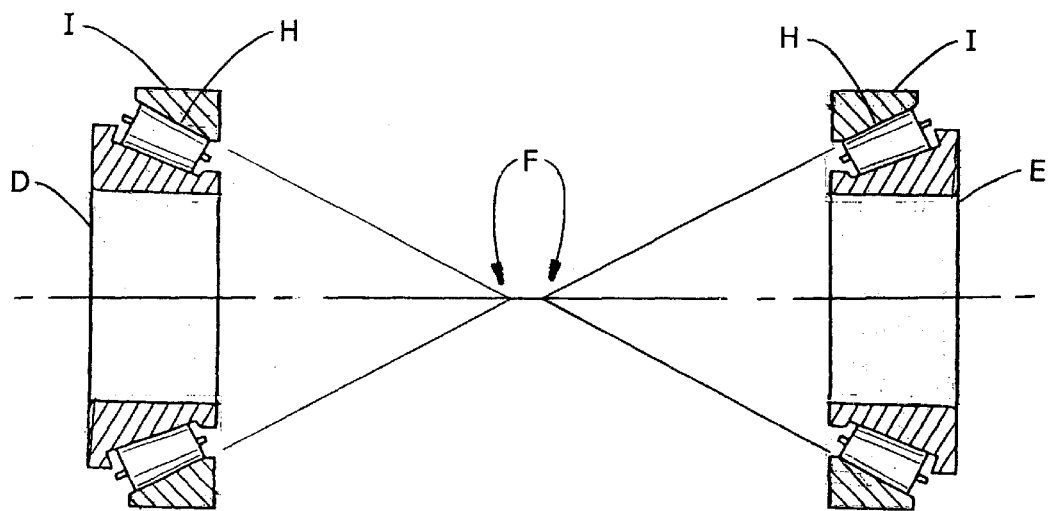
FIG. 3 is an illustration of two tapered roller bearings mounted in an indirect bearing arrangement.
Figure 4:
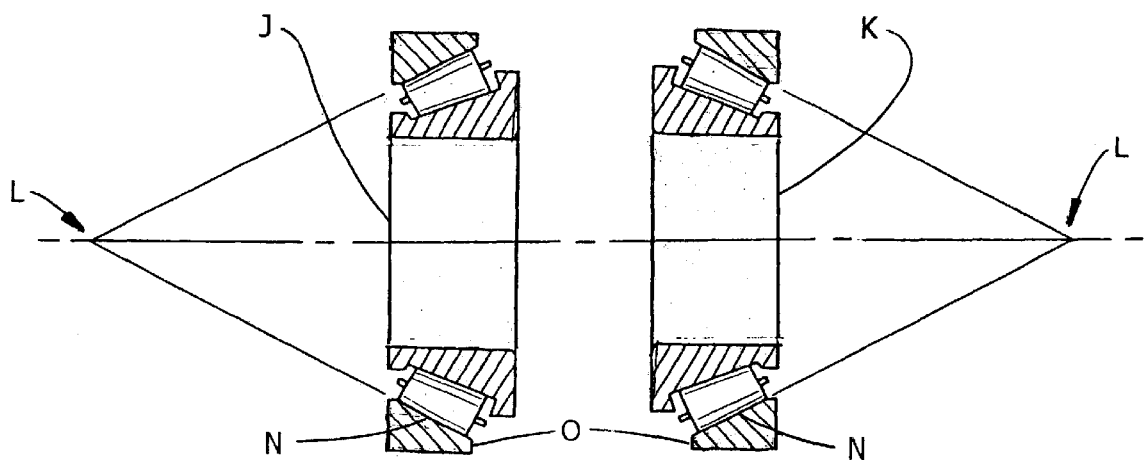
FIG. 4 is an illustration of two tapered roller bearings mounted in a direct bearing arrangement.

The term "direct bearing mounting arrangement" is a standard term within the bearing industry which identifies the physical mounting arrangement of two adjacent tapered roller bearings. FIGS. 3 and 4 show a comparison between a direct bearing mounting arrangement and an indirect mounting arrangement.

In FIG. 3, two tapered roller bearings D and E are mounted in an indirect bearing mounting arrangement. Two vertexes F are generated on the axial centerline of the tapered roller bearings D and E by extending the lines representing the point of contact between the rolling elements H of the bearing and the bearing cup I. It is noted that the vertexes F occur between the two tapered roller bearings.

In FIG. 4, two tapered roller bearings J and K are mounted in a direct bearing mounting arrangement. Two vertexes L are generated on the axial centerline of the tapered roller bearings J and K by extending the lines representing the point of contact between the rolling elements N of the bearing and the bearing cup O. In contrast to the vertexes F of the direct bearing mounting arrangement, the vertexes L do not occur between the tapered roller bearings, but occur instead outside of the tapered roller bearings. The difference between the location of these vertices is the primary distinction between a direct bearing mounting arrangement and an indirect bearing mounting arrangement.

While the description of the present invention identifies the use of tapered roller bearings, it should be noted that other bearing types, such as angular contact ball bearings, may be used, so long as the bearing is capable of accepting the axial and radial loads placed upon the bearings as used within the differential gear mechanism.

Therefore, the design of the present invention provides for a pinion mounting which is removable from the differential gear mechanism casing without disassembly of other components of the differential gear mechanism. The present invention also provides a simplified pinion assembly, simplified bearing setting, a more compact arrangement, better load distribution, and the potential for better stiffness when compared to devices using indirect and straddle tapered roller bearing mounting. Finally, the present invention also offers the potential for more efficient bearing design when compared to straddle mounted bearings.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A pinion mounting for a differential gear mechanism, comprising:
   an exterior bearing having a radial flange to mount the exterior bearing to a differential gear mechanism casing, the exterior bearing having a bearing cup and a bearing cone, the bearing cone having an extension which allows the bearing cone to be clamped rigidly between a yoke and an annular shoulder, and wherein the bearing extension provides a sealing surface for a continuous seal;
   an interior bearing in a direct bearing mounting arrangement with the exterior bearing, wherein the pinion shaft is supported by the exterior bearing and the interior bearing, the pinion shaft, the interior bearing, and the exterior bearing being removable from the differential gear mechanism casing without disassembly of other components of the differential gear mechanism;
   a pinion shaft supported by the exterior bearing and the interior bearing, wherein the pinion shaft includes the annular shoulder, and the pinion shaft, the interior bearing, and the exterior bearing being removable from the differential gear mechanism casing without disassembly of other components of the differential gear mechanism.

2. The pinion mounting for a differential gear mechanism of claim 1 wherein the exterior bearing includes an o-ring.

3. The pinion mounting for a differential gear mechanism of claim 2 wherein the exterior bearing is attached to the differential gear mechanism casing by a plurality of mounting bolts.

4. The pinion mounting for a differential gear mechanism of claim 3 further including a plurality of shims for proper installation of the exterior bearing, the interior bearing, and the pinion shaft.

5. The combination of the pinion mounting for a differential gear mechanism of claim 4 and a differential gear mechanism casing having a rotating ring gear fixed about an axis and meshing with a gear on the pinion shaft.

6. The pinion mounting for a differential gear mechanism of claim 5 wherein the pinion shaft has a distal end and a proximal end, the pinion shaft having an intermediate cylindrical surface between the distal end and the proximal end, an end cylindrical surface on the proximal end, and a gear located between the end cylindrical surface and the intermediate cylindrical surface.

7. The pinion mounting for a differential gear mechanism of claim 6 wherein the exterior bearing is a tapered roller bearing.

8. The pinion mounting for a differential gear mechanism of claim 7 wherein the interior bearing is a tapered roller bearing.

9. The pinion mounting for a differential gear mechanism of claim 8 wherein the radial flange has a first plurality of mounting holes.

10. The pinion mounting for a differential gear mechanism of claim 9 wherein the plurality of shims includes a set of bearing setting shims and a set of pinion setting shims.

11. The pinion mounting for a differential gear mechanism of claim 10 wherein the bearing setting shims have a second plurality of mounting holes sized and located to match the first plurality of mounting holes in the radial flange of the exterior bearing.

12. The pinion mounting for a differential gear mechanism of claim 11 wherein the bearing setting shims are washer shaped.

13. The pinion mounting for a differential gear mechanism of claim 12 wherein the pinion setting shims are washer shaped.

14. The pinion mounting for a differential gear mechanism of claim 13 wherein the gear on the pinion shaft is a bevel gear.

15. The pinion mounting for a differential gear mechanism of claim 13 wherein the gear on the pinion shaft is a hypoid gear.

16. A pinion mounting for a differential gear mechanism, comprising:
   an exterior tapered roller bearing flanged to mount the exterior tapered roller bearing to a differential gear mechanism casing with a plurality of mounting bolts, the exterior bearing having a bearing cup and a bearing cone, the bearing cone having an extension which allows the bearing cone to be clamped rigidly between a yoke and an annular shoulder and wherein the bearing extension provides a sealing surface for a continuous seal, the exterior tapered roller bearing having an o-ring;
   an interior tapered roller bearing, the interior tapered roller bearing being in a direct bearing mounting arrangement with the exterior tapered roller bearing;
   a pinion shaft having a gear, an intermediate cylindrical surface, an end cylindrical surface, and the annular shoulder, with the pinion shaft being supported by the exterior tapered roller bearing installed onto the intermediate cylindrical surface and by the interior tapered roller bearing mounted onto the end cylindrical surface; and,
   a plurality of washer-shaped shims for preloading the exterior tapered roller bearing and interior tapered roller bearing, and for setting the pinion engagement with a set of teeth on a ring gear of the differential gear mechanism, the plurality of washer-shaped shims, the pinion shaft, the interior tapered roller bearing, and the exterior tapered roller bearing being removable from the differential gear mechanism casing without disassembly of other components of the differential gear mechanism.

17. The pinion mounting for a differential gear mechanism of claim 16 wherein the gear is a bevel gear.

18. The pinion mounting for a differential gear mechanism of claim 16 wherein the gear is a hypoid gear.

19. A pinion mounting for a differential gear mechanism, comprising:
   an exterior bearing having a threaded portion for mounting the exterior bearing to a differential gear mechanism casing, the exterior bearing having a continuous seal and an o-ring, the exterior bearing also having a bearing cup and a bearing cone, the bearing cone having an extension which allows the bearing cone to be clamped rigidly between a yoke and an annular shoulder and wherein the bearing extension provides a sealing surface for the continuous seal;
   an interior bearing, the interior bearing being in a direct bearing mounting arrangement with the exterior bearing;
   a pinion shaft supported by the exterior bearing and the interior bearing, the pinion shaft including the annular shoulder; and,
   a plurality of shims, the plurality of shims, the pinion shaft, the interior bearing, and the exterior bearing being removable from the differential gear mechanism casing without disassembly of other components of the differential gear mechanism.

20. The pinion mounting for a differential gear mechanism of claim 19 wherein the pinion shaft has a distal end and a proximal end, the pinion shaft having an intermediate cylindrical surface between the distal end and the proximal end, an end cylindrical surface on the proximal end, and a gear adjacent to the end cylindrical surface and located between the end cylindrical surface and the intermediate cylindrical surface.

21. The pinion mounting for a differential gear mechanism of claim 20 wherein the exterior bearing is a tapered roller bearing.

22. The pinion mounting for a differential gear mechanism of claim 21 wherein the interior bearing is a tapered roller bearing.

23. The pinion mounting for a differential gear mechanism of claim 22 wherein the plurality of shims includes a set of bearing setting shims and a set of pinion setting shims.

24. The pinion mounting for a differential gear mechanism of claim 23 wherein the bearing setting shims are washer shaped.

25. The pinion mounting for a differential gear mechanism of claim 24 wherein the pinion setting shims are washer shaped.

26. The pinion mounting for a differential gear mechanism of claim 25 wherein the gear on the pinion shaft is a bevel gear.

27. The pinion mounting for a differential gear mechanism of claim 25 wherein the gear on the pinion shaft is a hypoid gear.

28. A pinion mounting for a differential gear mechanism, comprising:
   an exterior tapered roller bearing having a threaded portion for mounting the exterior tapered roller bearing to a differential gear mechanism casing, the exterior bearing having a bearing cup and a bearing cone, the bearing cone having an extension which allows the bearing cone to be clamped rigidly between a yoke and an annular shoulder and wherein the bearing extension provides a sealing surface for a continuous seal, the exterior tapered roller bearing also having an o-ring;

an interior tapered roller bearing, the interior tapered roller bearing being in a direct bearing mounting arrangement with the exterior bearing;

a pinion shaft having a gear, an intermediate cylindrical surface, and an end cylindrical surface, the pinion shaft being supported by the exterior tapered roller bearing installed onto the intermediate cylindrical surface and by the interior tapered roller bearing mounted onto the end cylindrical surface; and, a plurality of washer shaped shims for preloading the exterior tapered roller bearing and interior tapered roller bearing, and for setting the pinion engagement with a set of teeth on a ring gear of the differential gear mechanism, the plurality of washer-shaped shims, the pinion shaft, the interior tapered roller bearing, and the exterior tapered roller bearing being removable from the differential gear mechanism casing without disassembly of other components of the differential gear mechanism.

29. The pinion mounting for a differential gear mechanism of claim 28 wherein the gear is a bevel gear.

30. The pinion mounting for a differential gear mechanism of claim 28 wherein the gear is a hypoid gear.

31. A pinion mounting for a differential gear mechanism, comprising:

an exterior tapered roller bearing, the exterior tapered roller bearing having,
   a first inner race, the first inner race having a first raceway presented outwardly away from an axis of the exterior tapered roller bearing, the inner race having an extension which allows the first inner race to be clamped rigidly between a yoke and an annular shoulder, and wherein the bearing extension provides a sealing surface for a continuous seal, the continuous seal being interposed between the first outer race and the first inner race,
   a first outer race having a second raceway presented inwardly toward the axis and surrounding the first raceway of the first inner race, the first outer race having a radial flange with a plurality of mounting holes and a circumferential groove on an outside surface of the first outer race,
   a first plurality of tapered rolling elements arranged in a row between the first inner race and the first outer race and respectively contacting the first and second raceways of the first and second races,
   a first cage located between the first inner race and first outer race, the cage maintaining a spacing between the first plurality of tapered rolling elements, and
   an o-ring residing in the circumferential groove;

an interior tapered roller bearing, the interior tapered roller bearing having
   a second inner race, the second inner race having a third raceway presented outwardly away from the axis,
   a second outer race having a fourth raceway presented inwardly toward the axis and surrounding the third raceway of the second inner race,
   a second plurality of tapered rolling elements arranged in a row between the second inner race and the second outer race and contacting the third raceway and the fourth raceway of the respective races, and,
   a second cage located between the second inner race and second outer race, the second cage maintaining a spacing between the second plurality of tapered rolling elements;

a pinion shaft having a distal end and a proximal end, the pinion shaft having an intermediate cylindrical surface located between the distal end and a proximal end of the pinion shaft, the pinion shaft also having an end cylindrical surface at the proximal end of the pinion shaft and a gear located between the intermediate cylindrical surface and the end cylindrical surface, a first face at a first transition point between the gear and the end cylindrical surface, and a second face at a second transition point between the gear and the intermediate cylindrical surface, the pinion shaft also having the annular shoulder, the pinion shaft being supported by the exterior tapered roller bearing mounted onto the intermediate cylindrical surface of the pinion shaft and the interior tapered roller bearing mounted onto the end cylindrical surface of the pinion shaft;

a plurality of mounting bolts inserted though the first plurality of mounting holes in the radial flange of the first outer race to attach the exterior tapered roller bearing to a differential gear mechanism casing;

a set of bearing setting shims located between the radial flange of the first outer race and the differential gear mechanism casing, the set of bearing setting shims having a second plurality of mounting holes sized and located to match the first plurality of mounting holes in the radial flange of the first outer race, the set of bearing setting shims having a dimensional thickness as needed to properly preload the exterior tapered roller bearing and the interior tapered roller bearing; and, a set of pinion setting shims configured as to dimensionally locate the gear of the pinion shaft with a set of teeth on a ring gear of a differential gear mechanism, the set of pinion setting shims, the set of bearing setting shims, the plurality of mounting bolts, the pinion shaft, the interior tapered roller bearing, and the exterior tapered roller bearing being removable from the differential gear mechanism casing without disassembly of other components of the differential gear mechanism.

32. A method of mounting a pinion on a differential gear mechanism comprising the following steps:

providing a pinion mounting removable from a differential gear mechanism casing without disassembly of other components of the differential gear mechanism;

providing an exterior bearing having an outer race incorporating a mounting flange, the exterior bearing being mounted to a differential gear mechanism casing of the differential gear mechanism by retaining the mounting flange to the differential gear mechanism casing, the exterior bearing having a bearing cup and a bearing cone, the bearing cone having an extension which allows the bearing cone to be clamped rigidly between a yoke and an annular shoulder on a pinion shaft and wherein the bearing extension provides a sealing surface for a continuous seal; and, providing an interior bearing in direct bearing arrangement with the exterior bearing.

33. A method of mounting a pinion on a differential gear mechanism comprising the following steps:

providing a pinion mounting removable from a differential gear mechanism casing without disassembly of other components of the differential gear mechanism;

using an exterior bearing having an outer race incorporating a threaded portion, the exterior bearing being mounted to a differential gear mechanism casing of the differential gear mechanism by engaging the threaded portion with a matching threaded portion on the differential gear mechanism casing, the exterior bearing having a bearing cup and a bearing cone, the bearing cone having an extension which allows the bearing cone to be clamped rigidly between a yoke and an annular shoulder on a pinion shaft and wherein the bearing extension provides a sealing surface for a continuous seal; and, using an interior bearing in direct bearing arrangement with the exterior bearing.

34. A method of mounting a pinion on a differential gear mechanism comprising the following steps:

providing a pinion mounting removable from the differential gear mechanism casing without disassembly of other components of the differential gear mechanism;

providing an exterior tapered roller bearing having a radial flange for mounting an outer race of the exterior tapered roller bearing into a differential gear mechanism casing, the exterior bearing having a bearing cup and a bearing cone, the bearing cone having an extension which allows the bearing cone to be clamped rigidly between a yoke and an annular shoulder on a pinion shaft and wherein the bearing extension provides a sealing surface for a continuous seal;

providing the outer race of the exterior tapered roller bearing with an o-ring;

installing an interior tapered roller bearing onto a support located within the casing of the differential gear mechanism;

providing the pinion shaft with an intermediate cylindrical surface for installing the exterior tapered roller bearing onto the pinion shaft;

providing the pinion shaft with an end cylindrical surface for mounting the interior tapered roller bearing onto the pinion shaft;

mounting the exterior tapered roller bearing in a direct arrangement with the interior tapered roller bearing;

installing the exterior tapered roller bearing onto the casing of the differential gear mechanism by use of a plurality of mounting bolts;

installing a plurality of bearing setting shims between the radial flange of the outer race of the exterior tapered roller bearing and the differential gear mechanism casing to preload the exterior tapered roller bearing and the interior tapered roller bearing; and, installing pinion setting shim washers between a face on the pinion shaft and a face on an inner race of the interior tapered roller bearing to set the dimensional relationship between the gear on the pinion shaft and a set of teeth on a ring gear of the differential gear mechanism.

35. A method of mounting a pinion on a differential gear mechanism comprising the following steps:

providing a pinion mounting removable from the differential gear mechanism casing without disassembly of other components of the differential gear mechanism;

providing an exterior tapered roller bearing having a threaded portion for mounting an outer race of the exterior tapered roller bearing into a differential gear mechanism casing, the exterior bearing having a bearing cup and a bearing cone, the bearing cone having an extension which allows the bearing cone to be clamped rigidly between a yoke and an annular shoulder on a pinion shaft and wherein the bearing extension provides a sealing surface for a continuous seal;

providing the outer race of the exterior tapered roller bearing with an o-ring;

installing an interior tapered roller bearing onto a support located within the casing of the differential gear mechanism;

mounting the exterior tapered roller bearing in a direct arrangement with the interior tapered roller bearing;

providing a pinion shaft having an intermediate cylindrical surface for installing the exterior tapered roller bearing onto the pinion shaft;

providing the pinion shaft with an end cylindrical surface for mounting the interior tapered roller bearing onto the pinion shaft;

installing a plurality of bearing setting shims between the outer race of the exterior tapered roller bearing and the differential gear mechanism casing to preload the exterior tapered roller bearing and the interior tapered roller bearing; and, installing pinion setting shim washers between a face on the pinion shaft and a face on an inner race of the interior tapered roller bearing to set the dimensional relationship between the gear on the pinion shaft and a set of teeth on a ring gear of the differential gear mechanism.

* * * * *